Patented Sept. 3, 1940

2,213,752

UNITED STATES PATENT OFFICE 2,213,752

POLYVINYL ACETAL RESIN SHEETS CONTAINING A TETRAHYDROFURFURYL ESTER OF PHTHALIC ACID

Donald R. Swan, Rochester, N. Y., assignor to Eastman Kodak Company, Rochester, N. Y., a corporation of New Jersey No Drawing. Application September 23, 1939, Serial No. 296,307

3 Claims. (Cl. 260—36)

This invention relates to polyvinyl acetal resin sheets, and more particularly to sheets suitable for the manufacture of safety glass.

One object of my invention is to produce compositions of matter which can be made into permanently transparent sheets suitable for use in laminated, shatter-proof glass. Another object is to produce compositions which can be rolled, extruded, molded, or otherwise worked into relatively thick sheets and massive plastics. Other objects will hereinafter appear.

I have discovered that a tetrahydrofurfuryl ester of phthalic acid selected from the group consisting of di-tetrahydrofurfuryl phthalate and ethyl tetrahydrofurfuryl phthalate is a useful plasticizer for polyvinyl acetal resins, such, for instance, as polyvinyl acetaldehyde acetal resins, polyvinyl formaldehyde acetal resins, and polyvinyl butyraldehyde acetal resins. Furthermore, I have discovered that when 40 or more parts of either of these esters is used with 100 parts of a polyvinyl acetal resin in which a predominating proportion of the acetal groups are formaldehyde acetal groups or butyraldehyde acetal groups, an unusual and remarkable effect is obtained which I may call "elasticizing." That is to say, a sheet of polyvinyl formaldehyde or butyraldehyde acetal resin containing about 40 or more parts of di-tetrahydrofurfuryl phthalate or ethyl tetrahydrofurfuryl phthalate per 100 parts of resin is not only permanently transparent, but it possesses the property which, in the rubber industry, is known as "nerve": namely, the property of stretching to a considerable extent when tension is exerted upon it, and returning it to its original dimensions when the tension is released. This property renders such sheets, which I shall call "rubbery" sheets, particularly useful in the manufacture of shatter-proof glass. When the resin used is a polyvinyl formaldehyde acetal resin, it will usually be found necessary to use 60 or more parts of di-tetrahydrofurfuryl phthalate or ethyl tetrahydrofurfuryl phthalate per 100 parts of resin in order to obtain this rubbery property.

Sheets for use in laminated glass may be made by dissolving the polyvinyl formaldehyde or butyraldehyde acetal resin and the di-tetrahydro-furfuryl phthalate or ethyl tetrahydrofurfuryl phthalate in a suitable volatile solvent or solvent mixture, such, for instance, as acetone, methanol, acetone-methanol mixtures, ethylene chloride-methanol mixtures, etc., about 300 to 500 or more parts of the solvent or solvent mixture being used per 100 parts of the resin. The solution is then cast as a sheet, the volatile solvent evaporated, and the sheet stripped from the casting surface.

Sheets for use in laminated glass may also be made without the use of volatile solvent by extrusion, for example, in the manner set forth in application Serial No. 147,934, of John S. Kimble and Ernest C. Blackard, filed June 12, 1937. For example, 40 or more parts of di-tetrahydrofurfuryl phthalate or of ethyl tetrahydrofurfuryl phthalate and 100 parts of a polyvinyl formaldehyde or butyraldehyde acetal resin may be mixed in a suitable, jacketed mixer at a low temperature, for example 10° C., and the mixture may then be worked on hot rolls, in the manner described in U. S. Patent 2,048,686, of F. R. Conklin, until complete homogenization has taken place. The mass thus produced may then be extruded through an annular die, and the tube so formed slit to form a sheet.

The polyvinyl acetal resins can be prepared by reacting polyvinyl alcohol with an aldehyde in the presence of an acetal condensation catalyst, e. g., a mineral acid. These resins can also be prepared by simultaneously de-esterifying a polyvinyl aliphatic ester and reacting the de-esterification product with an aldehyde in the presence of a de-esterifying catalyst and acetal condensation catalyst. Mineral acids are catalysts for both de-esterification and acetal formation.

Examples of the preparation of polyvinyl formaldehyde acetal resins may be found in U. S. Patent 1,955,068, Examples 1, 4 and 5; in U. S. Patent 2,036,092, Examples 1, 2, 3, 7 and 8; in British Patent 454,691, Examples 1, 2, 3, 4, 5, 6 and 7; in British Patent 404,279, Example 3; and in British Patent 436,072, Examples 1, 2, 3, 4, 5, 6 and 7. Further examples of the preparation of polyvinyl formaldehyde acetal resins are as follows:

25 lbs. of polyvinyl acetate, the viscosity of whose "molar" solution (86.08 g. per liter) in benzene was 45 centipoises, was dissolved in 75 lbs. of 70% acetic acid. To this solution were added 56 grams of hydroxylamine hydrochloride, for stabilizing the resin, 5.25 lbs. of trioxymethylene, and 6.25 lbs. of 35% HCl. The reaction mixture was allowed to stand for 5 days at 40° C., after which it was diluted with acetic acid. The resin was precipitated by pouring into cold water, washed, and dried. Analysis showed the resin to have an acetate group content equivalent to 10.6% by weight of polyvinyl acetate and a hydroxyl group content equivalent to 7.1% by weight of polyvinyl alcohol.

70 lbs. of polyvinyl acetate, the viscosity of whose molar solution in benzene was 45 centipoises, was dissolved in a mixture of 336 lbs. of glacial acetic acid and 224 lbs. of water. After solution was effected, there were added a solution of 318 grams of sodium nitrite in 500 cc. of water, for stabilizing the resin, 15.2 lbs. of trioxymethylene and 17.5 lbs. of 35% HCl. The reaction mixture was allowed to stand for 5 days at 40° C., whereupon 5 lbs. additional 35% HCl was added and the reaction continued for 6 days longer: a total of 11 days at 40° C. The reaction mixture was then diluted with a mixture of acetic acid and ethyl alcohol, and the resin was precipitated by pouring into cold water, washed, and dried. Analysis showed the resin to have an acetate group content equivalent to 10.7% by weight of polyvinyl acetate and a hydroxyl group content equivalent to 11.2% by weight of polyvinyl alcohol.

Examples of the preparation of polyvinyl butyraldehyde acetal resins may be found in U. S. Patent 2,044,730, Examples 2, 5 and 6; British Patent 466,598, Example 5; French Patent 813,303, Example 1; French Patent 813,514, Examples 1, 2, 3 and 4; and British Patent 459,878, Examples 1, 2, 5, 6, 7, 8, 9 and 10. An additional example of the preparation of a polyvinyl butyraldehyde acetal resin is as follows:

23.6 lbs. of polyvinyl acetate, the viscosity of whose molar solution in benzene was 45 centipoises, was dissolved in 56.5 lbs. of 95% ethyl alcohol. To this solution was added 7.9 lbs. of butyraldehyde and 5.9 lbs. of 35% HCl. The reaction mixture was allowed to stand for 4 days at 40° C., after which it was diluted with ethyl alcohol and acetic acid, and the resin precipitated by pouring into cold water, washed, and dried. Analysis showed the resin to have an acetate group content equivalent to 3.1% by weight of polyvinyl acetate and a hydroxyl group content equivalent to 16.3% by weight of polyvinyl alcohol.

What I claim as my invention and desire to be secured by Letters Patent of the United States is:

1. A transparent, rubbery sheet comprising 100 parts of a polyvinyl acetal resin in which a predominating proportion of the acetal groups are selected from a group consisting of formaldehyde acetal groups and butyraldehyde acetal groups, and, as an elasticizer therefor, at least 40 parts, approximately, of a tetrahydrofurfuryl ester selected from the group consisting of di-tetrahydrofurfuryl phthalate and ethyl tetrahydrofurfuryl phthalate.

2. A transparent, rubbery sheet comprising 100 parts of a polyvinyl acetal resin in which a predominating proportion of the acetal groups are selected from a group consisting of formaldehyde acetal groups and butyraldehyde acetal groups, and, as an elasticizer therefor, at least 40 parts, approximately, of di-tetrahydrofurfuryl phthalate.

3. A transparent, rubbery sheet comprising 100 parts of a polyvinyl acetal resin in which a predominating proportion of the acetal groups are selected from a group consisting of formaldehyde acetal groups and butyraldehyde acetal groups, and, as an elasticizer therefor, at least 40 parts, approximately, of ethyl tetrahydrofurfuryl phthalate.

DONALD R. SWAN.